(12) United States Patent
Li et al.

(10) Patent No.: US 10,386,711 B2
(45) Date of Patent: Aug. 20, 2019

(54) DISPLACEMENT-TYPE SCANNING STEREOSCOPIC DISPLAY APPARATUS

(71) Applicant: SHENZHEN CHINA STAR OPTOELECTRONICS SEMICONDUCTOR DISPLAY TEDCHNOLOGY CO., LTD., Guangdong (CN)

(72) Inventors: Qiang Li, Guangdong (CN); Ting Dou, Guangdong (CN)

(73) Assignee: SHENZHEN CHINA STAR OPTOELECTRONICS SEMICONDUCTOR DISPLAY TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 15/744,822

(22) PCT Filed: Oct. 20, 2017

(86) PCT No.: PCT/CN2017/106988
§ 371 (c)(1),
(2) Date: Jan. 14, 2018

(87) PCT Pub. No.: WO2019/061592
PCT Pub. Date: Apr. 4, 2019

(65) Prior Publication Data
US 2019/0104286 A1   Apr. 4, 2019

(30) Foreign Application Priority Data
Sep. 30, 2017   (CN) .......................... 2017 1 0922614

(51) Int. Cl.
*G03B 21/60* (2014.01)
*H04N 9/31* (2006.01)
(Continued)

(52) U.S. Cl.
CPC .......... *G03B 21/60* (2013.01); *G02B 6/0016* (2013.01); *G02B 27/22* (2013.01); *G09F 13/36* (2013.01);
(Continued)

(58) Field of Classification Search
CPC .... H04N 9/3129; G02B 6/0016; G02B 27/22; G03B 21/60
See application file for complete search history.

(56) References Cited

U.S. PATENT DOCUMENTS 3,048,083 A * 8/1962 Rosenbaum ........... G03B 31/06
353/10
6,005,608 A * 12/1999 Chakrabarti ....... G02B 27/2285
348/46

(Continued)

FOREIGN PATENT DOCUMENTS

CN      207249263        4/2018
EP      0758778 A2 *     2/1997  ......... G02B 27/2285
(Continued)

*Primary Examiner* — Sultan Chowdhury
*Assistant Examiner* — Magda Cruz
(74) *Attorney, Agent, or Firm* — Hauptman Ham, LLP (57) ABSTRACT

The disclosure discloses a displacement-type scanning stereoscopic display apparatus including: a protective shell, projection screens, light shielding cases, two rotary shafts, conveyor belts, at least two scattering plates; and the rotary shaft is uniformly rotated at a high speed, the scattering plates fixed on the conveyor belt periodically receives image slices projected from the projection screens, and when the scattering plates are moved from one of the rotary shaft positions to the other rotary shaft position, a scanning display of the image slice corresponding to the stereoscopic image is completed. According to the embodiment of the disclosure, by the rotation of the rotary shaft, the moving screen can be moved uniformly, and the display effect and (Continued)

the service life of the stereoscopic display apparatus can be remarkably improved.

7 Claims, 12 Drawing Sheets

(51) Int. Cl.
*G02B 27/22* (2018.01)
*F21V 8/00* (2006.01)
*G09F 13/36* (2006.01)
*H04N 13/388* (2018.01)

(52) U.S. Cl.
CPC ......... *H04N 9/3129* (2013.01); *H04N 13/388* (2018.05)

(56) References Cited

U.S. PATENT DOCUMENTS

| | | | |
|---|---|---|---|
| 6,646,623 B1 * | 11/2003 | Chakrabarti | G09G 1/06 345/5 |
| 2004/0150792 A1 * | 8/2004 | Satoh | H04N 13/0493 353/7 |
| 2018/0267326 A1 * | 9/2018 | Broadbent | G02B 27/2271 |

FOREIGN PATENT DOCUMENTS

| | | | | |
|---|---|---|---|---|
| JP | 2004056442 A | * | 2/2004 | ............ H04N 13/04 |
| JP | 2004072221 A | * | 3/2004 | ............ H04N 13/04 |
| JP | 2014139620 A | * | 7/2014 | ............ G02B 27/22 |

* cited by examiner

DISPLACEMENT-TYPE SCANNING STEREOSCOPIC DISPLAY APPARATUS

RELATED APPLICATIONS

The present application is a National Phase of International Application Number PCT/CN2017/106988, filed Oct. 20, 2017, and claims the priority of China Application No. 201710922614.9, filed Sep. 30, 2017.

FIELD OF THE DISCLOSURE

The disclosure relates to the field of three-dimensional stereoscopic display technology, and more particularly to a displacement-type scanning stereoscopic display apparatus.

BACKGROUND

Three-dimensional display technology is a novel display technology based on the observer's stereoscopic vision mechanism. Compared with the traditional two-dimensional flat panel display technology, three-dimensional display apparatus can provide liveness, depth information that two-dimensional display cannot provide, and can more truly reproduce objects and information, more in line with the human visual habits, so the development of three-dimensional display technology is to adapt to future trends in technology.

The current three-dimensional display technology, includes holographic three-dimensional, static body, dynamic body (translation body scan, rotating body scan) and other technologies.

Figure 1:
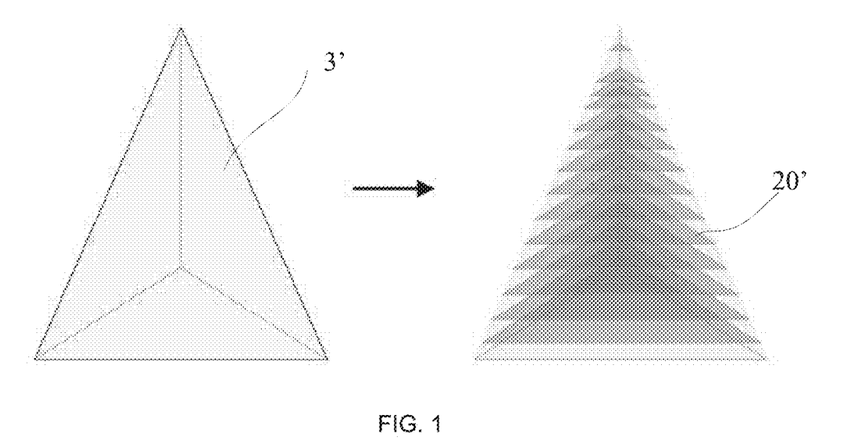
FIG. 1 is a schematic view of a plurality of parallel image slices generated according to a stereoscopic object in the prior art.
Figure 2:
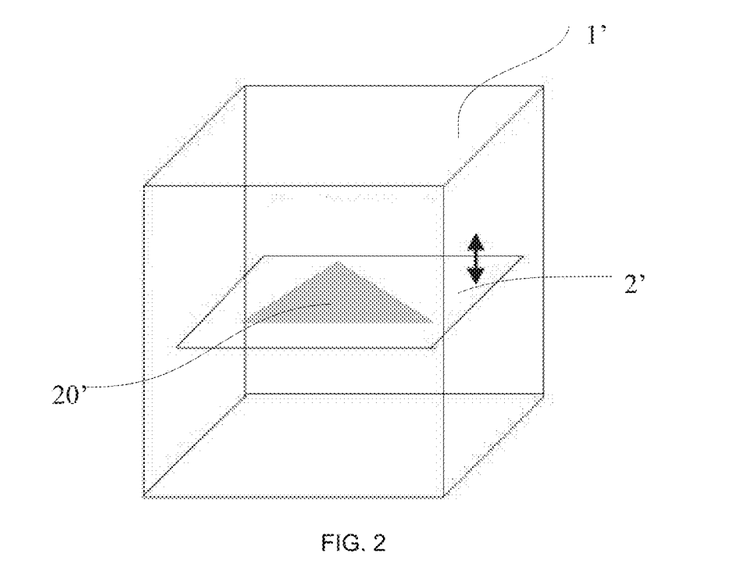
FIG. 2 is a schematic view of image slice projected on a moving screen in the prior art.
Figure 3:
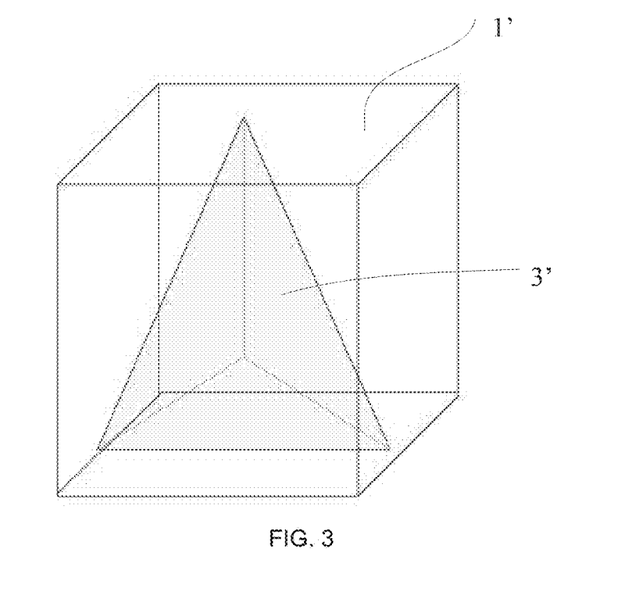
FIG. 3 is a schematic view showing an effect of displaying a stereoscopic object in a stereoscopic display apparatus in the prior art.

The translational body scanning technology is that a display screen rapidly moves in the same direction to build an imaging space, that is, a display plate does a reciprocating motion along an axis vertical to the display plane to build the imaging space. As shown in FIGS. 1 to 3, the principle of the current body scanning technique is shown. First, it is necessary to generate a plurality of parallel image slices 20' according to the stereoscopic image 3' to be displayed in FIG. 1; as shown in FIG. 2, the moving screen 2' performs a reciprocating translational motion in the stereoscopic display apparatus 1'; and simultaneously, the different image slices 20' are projected onto the moving screen 2' rapidly moved to the corresponding position. According to the human eye visual temporary principle, the stereoscopic image can be presented in the stereoscopic display apparatus (shown in FIG. 3).

Figure 4:
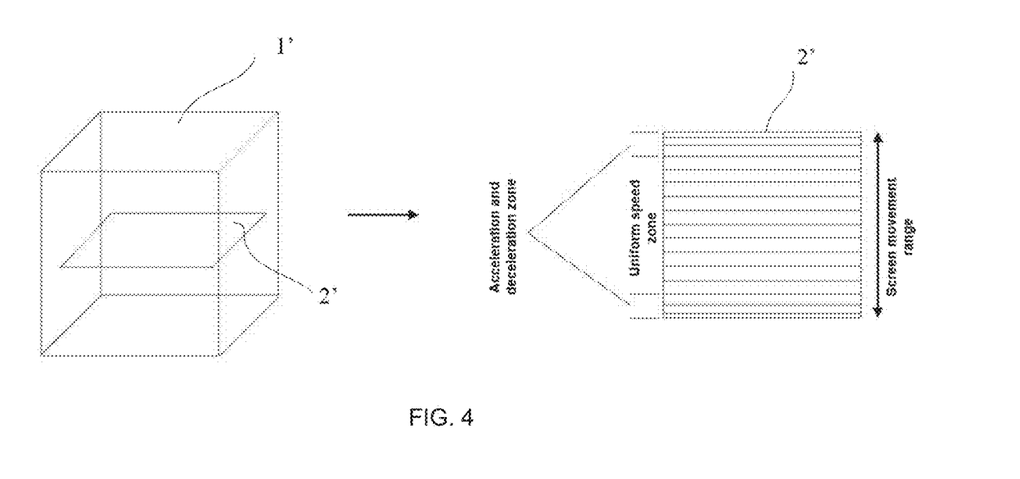
FIG. 4 is a schematic view of the non-linear motion of the moving screen of the stereoscopic display apparatus in FIG. 2.

However, in the current body scanning technique, in order to increase the depth of field of the imaging space, it is necessary to require that the portion of the uniform motion in the speed distribution as large as possible, and that the acceleration and deceleration portions are required to be as small as possible; as shown in FIG. 4, where the upper and lower ends of the region is the acceleration and deceleration zone, and the middle of the region is uniform speed zone. Therefore, the movement of the moving screen 2' is a non-linear motion, which makes the drive device very complex, and the screen reciprocating motion needs to move along the slide rail, mechanical noise and mechanical wear will be inevitably produced, thereby the service life of the entire system is affected; simultaneously, if the volume and the energy loss of the mechanical driver need to be reduced, the weight of the screen is required to be reduced, then it is inevitable to reduce the size of the screen, which will reduce the size of the imaging space, so that the application scenario will be greatly restricted.

SUMMARY

A technical problem to be solved by the disclosure is to provide a displacement-type scanning stereoscopic display apparatus; by the rotation of the rotary shaft, the moving screen can be moved uniformly, and the display effect and the service life of the stereoscopic display apparatus can be remarkably improved.

To solve the technical problem, an aspect of an embodiment of the disclosure provides a displacement-type scanning stereoscopic display apparatus including:

a protective shell having a sealed stereoscopic box structure;

a projection screen, disposed at a top end of the protective shell, applied to project an image slice of a stereoscopic image at a predetermined frequency;

light shielding cases, comprising a first light shielding case and a second light shielding case, the first light shielding case disposed around an upper side surface of the protective shell, and the second light shielding case is disposed around a lower side surface of the protective shell, and an area between the first and the second light shielding cases being a display area;

two rotary shafts pivoted parallel to each other between two opposite sides of the protective shell, and one of the two shafts is located at top of the display area and the other at bottom of the display area, the two rotary shafts keeping a same direction of rotation;

a conveyor belt surrounding the two rotary shafts to form two parallel conveying surfaces;

at least two scattering plates, fixed to outside of the conveyor, applied to scatter the image slices projected by the projection screen;

the rotary shaft is uniformly rotated at a high speed, the scattering plates fixed on the conveyor belt periodically receives image slices projected from the projection screen, and when the scattering plates are moved from one of the rotary shaft positions to the other rotary shaft position, a scanning display of the image slice corresponding to the stereoscopic image is completed.

The internal of the protective shell is filled with a light gas or is a vacuum environment, so as to reduce or avoid the resistance that the scattering plate is subjected during high speed movement.

The projection screen is two pieces, and each projection screen is facing a scattering plate located on a conveyance surface.

The two rotary shafts have the same diameter.

The scattering plate is two pieces and the lengths of the two conveyor belts located between the two scattering plates are the same.

The scattering plates are four pieces, wherein lengths of the two conveyor belts between a first and a third scattering plates scattering plate are the same; a second scattering plate is disposed in a clockwise direction of the first scattering plate, a length of a conveyor belt between the first scattering plate and the second scattering plate is ¼ of a circumferential length of the rotary shaft; and a fourth scattering plate is disposed in a clockwise direction of the third scattering plate, a length of a conveyor belt between the third scattering plate and the fourth scattering plate is ¼ of a circumferential length of the rotary shaft;

The protective shell is made of a transparent material at least at a display region of top and side wall thereof.

Accordingly, still another aspect of an embodiment of the disclosure provides a displacement-type scanning stereoscopic display apparatus including:

a protective shell having a sealed stereoscopic box structure, and internal of the protective shell being filled with a light gas or being a vacuum environment:

a projection screen, disposed at a top end of the protective shell, applied to project an image slice of a stereoscopic image at a predetermined frequency;

light shielding cases, comprising a first light shielding case and a second light shielding case, the first light shielding case disposed around an upper side surface of the protective shell, and the second light shielding case is disposed around a lower side surface of the protective shell, and an area between the first and the second light shielding cases being a display area;

two rotary shafts pivoted parallel to each other between two opposite sides of the protective shell, and one of the two shafts is located at top of the display area and the other at bottom of the display area, the two rotary shafts keeping a same direction of rotation;

a conveyor belt surrounding the two rotary shafts to form two parallel conveying surfaces; and at least two scattering plates, fixed to outside of the conveyor, applied to scatter the image slices projected by the projection screen;

The projection screen is two pieces, and each projection screen is facing a scattering plate located on a conveyance surface;

the rotary shaft is uniformly rotated at a high speed, the scattering plates fixed on the conveyor belt periodically receives image slices projected from the projection screen, and when the scattering plates are moved from one of the rotary shaft positions to the other rotary shaft position, a scanning display of the image slice corresponding to the stereoscopic image is completed.

The two rotary shafts have the same diameter; the scattering plates are two pieces, and the lengths of the two conveyor belts located between the two scattering plates are the same.

The scattering plates are four pieces, wherein lengths of the two conveyor belts between a first and a third scattering plates scattering plate are the same; a second scattering plate is disposed in a clockwise direction of the first scattering plate, a length of a conveyor belt between the first scattering plate and the second scattering plate is ¼ of a circumferential length of the rotary shaft; and a fourth scattering plate is disposed in a clockwise direction of the third scattering plate, a length of a conveyor belt between the third scattering plate and the fourth scattering plate is ¼ of a circumferential length of the rotary shaft.

The protective shell is made of a transparent material at least at a display region of top and side wall thereof.

Accordingly, another aspect of an embodiment of the disclosure also provides a displacement-type scanning stereoscopic display apparatus including:

a protective shell having a sealed stereoscopic box structure;

light shielding cases, comprising a first light shielding case and a second light shielding case, the first light shielding case disposed around an upper side surface of the protective shell, and the second light shielding case is disposed around a lower side surface of the protective shell, and an area between the first and the second light shielding cases being a display area;

two rotary shafts pivoted parallel to each other between two opposite sides of the protective shell, and one of the two shafts is located at top of the display area and the other at bottom of the display area, the two rotary shafts keeping a same direction of rotation;

a conveyor belt surrounding the two rotary shafts to form two parallel conveying surfaces;

at least two display plates, fixed to the outside of the conveyor, applied to display image slices of stereoscopic images at predetermined frequencies;

the rotary shaft is uniformly rotated at a high speed, the display plate fixed on the conveyor belt and vertically spaced from the conveyor belt periodically displays image slices, and when the display plates are moved from one of the rotary shaft positions to the other rotary shaft position, a scanning display of the image slice corresponding to the stereoscopic image is completed.

The internal of the protective shell is filled with a light gas or is a vacuum environment, so as to reduce or avoid the resistance that the display plate is subjected during high speed movement.

The two rotary shafts have the same diameter.

The display plate is two pieces and the lengths of the two conveyor belts located between the two display plates are the same.

the display plates are four pieces, wherein lengths of the two conveyor belts between a first and a third display plates display plate are the same; a second display plate is disposed in a clockwise direction of the first display plate, a length of a conveyor belt between the first display plate and the second display plate is ¼ of a circumferential length of the rotary shaft; and a fourth display plate is disposed in a clockwise direction of the third display plate, a length of a conveyor belt between the third display plate and the fourth display plate is ¼ of a circumferential length of the rotary shaft.

the protective shell is made of a transparent material at least at a display region of its side wall.

The embodiment of the disclosure has the following advantageous effects:

First, in the embodiment of the disclosure, the moving screen (such as a scattering plate or a display plate) is uniformly moved in the display area, the motion mechanism is linearly moved, and there is no acceleration or deceleration condition, and the load of the drive mechanism can be reduced;

Simultaneously, in the embodiment of the disclosure, the movement of the moving screen is driven by the rotation of the rotary shaft, and the slide rail movement mechanism is not needed so as to reduce or avoid the friction;

Further, in the embodiment of the disclosure, the protective shell of the stereoscopic display apparatus is filled with a light gas or is a vacuum environment to reduce or avoid the resistance that the display plate is subjected during high speed movement, and further improve the service life of the stereoscopic display apparatus;

In addition, in the embodiment of the disclosure, since at least two scattering plates or display plates are provided, the moving screen only needs to pass through display area once in one scanning period, so the display efficiency can be improved; simultaneously, the two front and rear stereoscopic display areas can be formed.

BRIEF DESCRIPTION OF THE DRAWINGS

In order to illustrate technical schemes of the disclosure or the prior art more clearly, the following section briefly introduces drawings used to describe the embodiments and prior art. Obviously, the drawing in the following descriptions is just some embodiments of the disclosure. The ordinary person in the related art can acquire the other drawings according to these drawings without offering creative effort.

DETAILED DESCRIPTION OF PREFERRED EMBODIMENTS

The following sections offer a clear, complete description of the disclosure in combination with the embodiments and accompanying drawings. Obviously, the embodiments described herein are only a part of, but not all of the embodiments of the disclosure. In view of the embodiments described herein, any other embodiment obtained by those of ordinary skill in the art skilled in this art without offering creative effort is included in a scope claimed by the disclosure.

It should be further noted that in order to prevent the present invention to be obscured due to unnecessary details, only apparatus structures and/or processing steps closely related to the solution according to the present invention are shown in the accompanying drawings, while other details having little relations are omitted.

Figure 5:
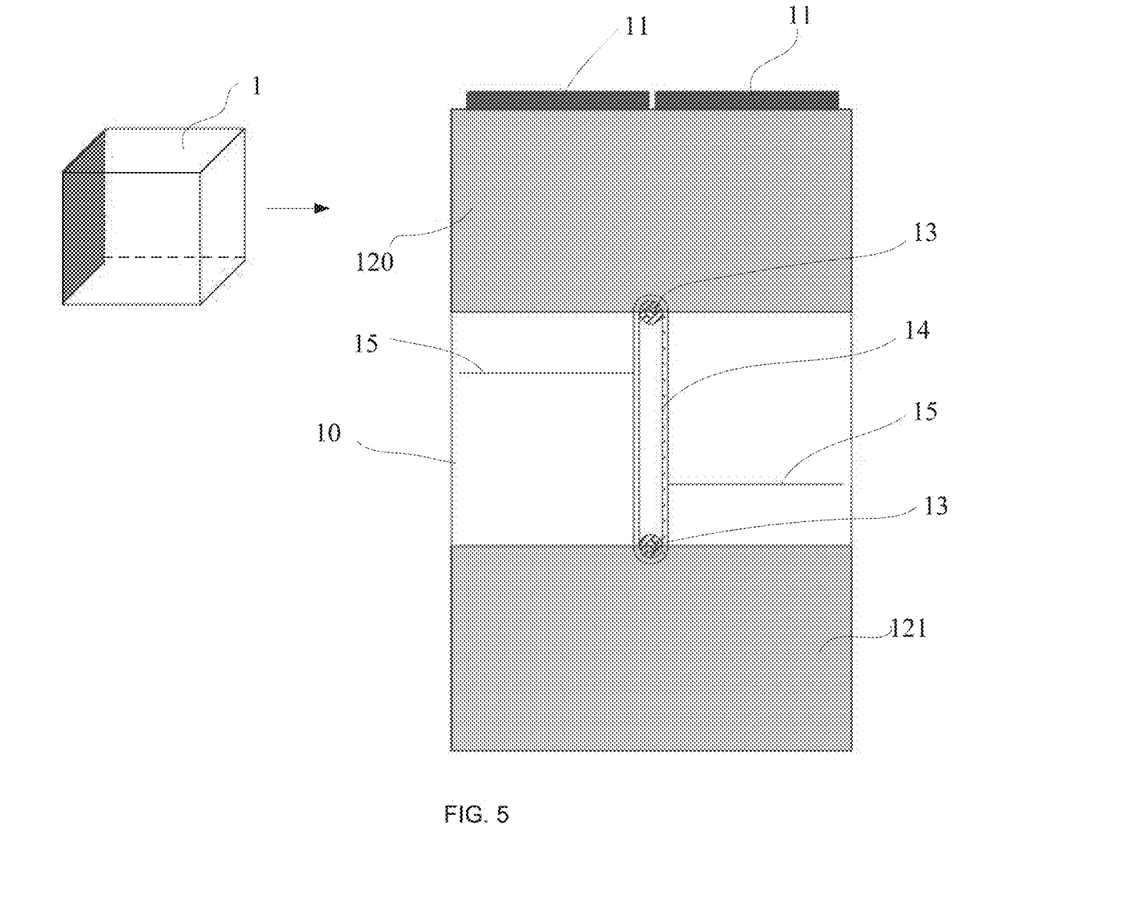
FIG. 5 is a schematic side view of an embodiment of the displacement-type scanning stereoscopic display apparatus provided by the disclosure.
Figure 6:
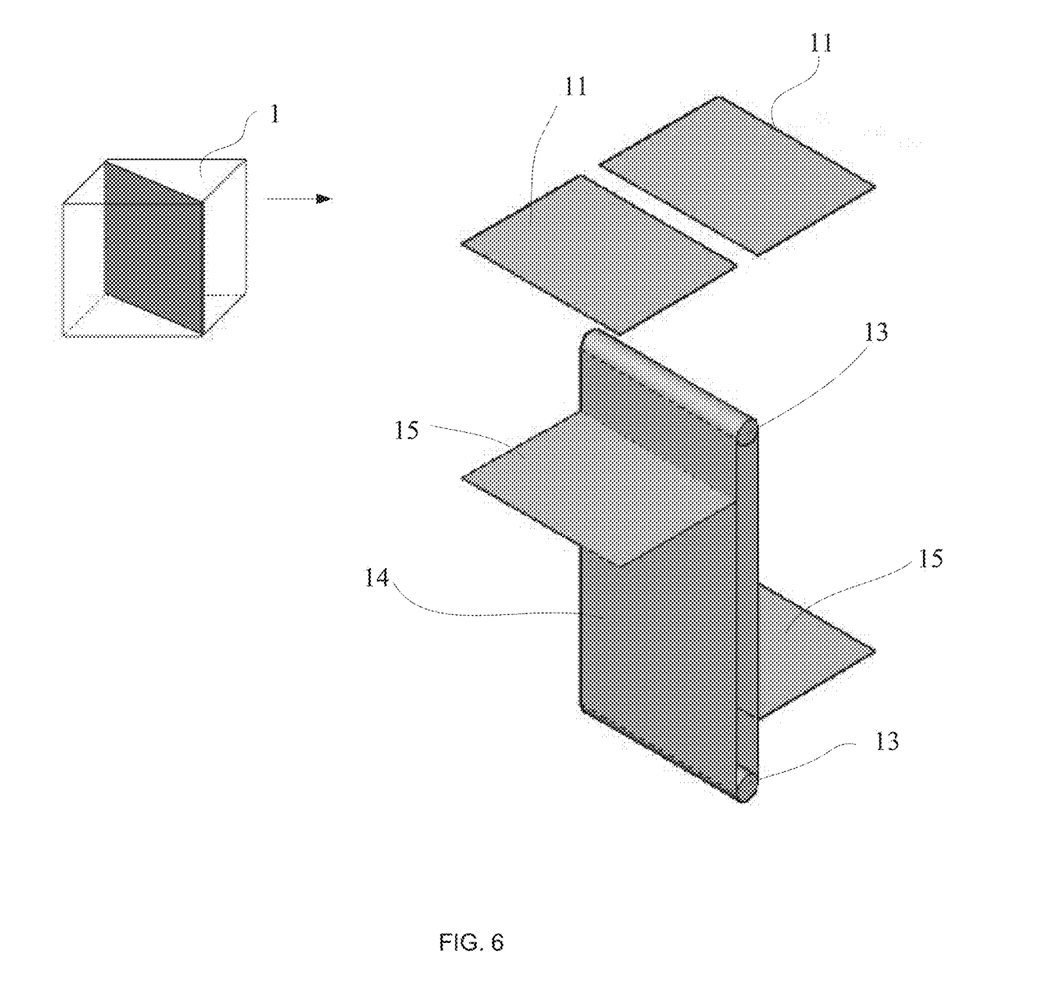
FIG. 6 is a schematic perspective view of an embodiment of a displacement-type scanning stereoscopic display apparatus provided by the disclosure.
Figure 7:
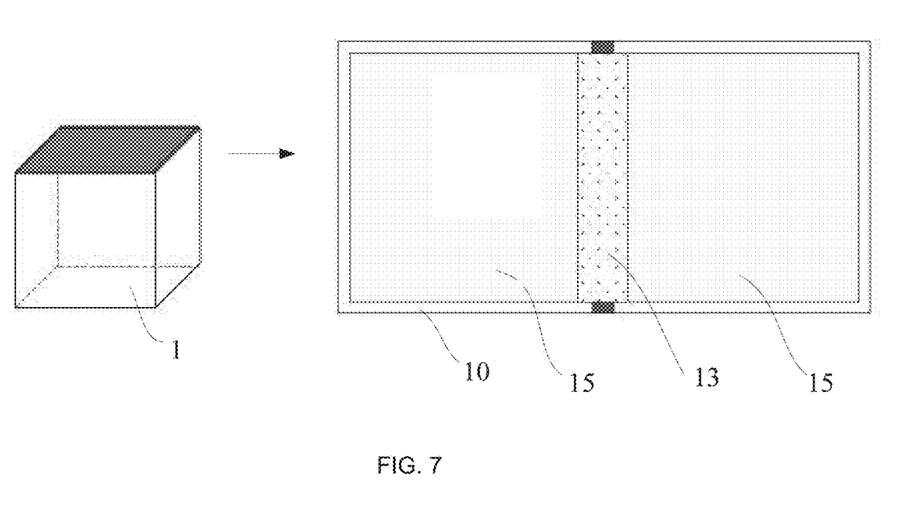
FIG. 7 is a schematic top view of an embodiment of a displacement-type scanning stereoscopic display apparatus provided by the disclosure.
Figure 8:
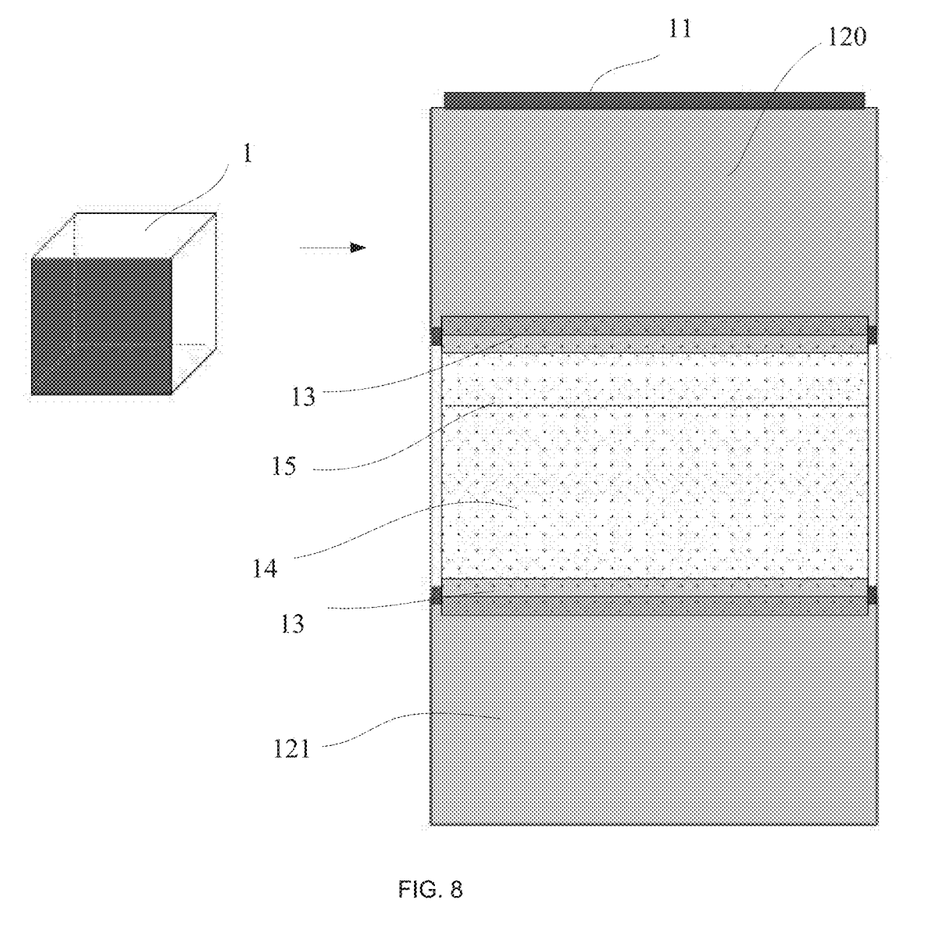
FIG. 8 is a schematic elevational view of an embodiment of the displacement-type scanning stereoscopic display apparatus provided by the disclosure.

As shown in FIG. 5, there is a schematic side view of an embodiment of the displacement type scanning display apparatus according to the disclosure, the left side is a simplified diagram of the stereoscopic display apparatus and the right side is an enlarged side view of the stereoscopic display apparatus, later FIGS. 6 to 8 is also similar; combined with FIGS. 6 to 8, in the present embodiment, the displacement-type scanning stereoscopic display apparatus 1 includes:

a protective shell 10 having a sealed three-dimensional box structure;

projection screens 11, disposed at the top of the protective shell, applied to project an image slice of a stereoscopic image at a predetermined frequency, two projection screens 11 are shown in FIG. 5; and the position and the angle of the projection screen are set according to actual condition;

light shielding cases including a first light shielding case 120 and a second light shielding case 121, wherein the first light shielding case 120 is disposed around an upper side surface of the protective shell 10, and the second light shielding case 121 is disposed around a lower side surface of the protective shell 10, and an area between the first shielding case 120 and the second light shielding case 121 is a display area;

two rotary shafts 13 pivoted parallel to each other between two opposite sides of the protective shell 10, and one of the two shafts is located at the top of the display area and the other at the bottom of the display area, the two rotary shafts 13 keeping a same direction of rotation;

a conveyor belt 14 surrounding the two rotary shafts 13 to form two parallel conveying surfaces;

at least two scattering plates 15, fixed vertically to outside of the conveyor 14, applied to scatter the image slices projected by the projection screen 11, two scattering plates are shown in the figure; in the embodiment, the lengths of the two conveyor belts located between the two scattering plates are the same, and the length is equal to the distance between the axes of the two rotary shafts plus ½ of a circumferential length of the rotary shaft. It can be understood that the scattering plate 15 is preferably vertically fixed on the conveyor belt 14, and in FIG. 5, the scattering plate 15 is square; but it can be understood that the position, shape and angle of the scattering plate 15 are set according to the actual situation.

The rotary shafts 13 are uniformly rotated at a high speed and the scattering plates 15 fixed on the conveyor belt 14 periodically receive image slices projected from the projection screen 11, and when the scattering plates 15 are moved from the position of one of the rotary shaft 13 to the position of the other rotary shaft 13, a scanning display of a stereoscopic image corresponding to image slices is completed.

The internal of the protective shell 10 is filled with a light gas or is a vacuum environment, so as to reduce or avoid the resistance that the scattering plate 15 is subjected during high speed movement.

The projection screens are two pieces, in the following denoted as projection screen α and projection screen β respectively, and each projection screen is facing a scattering plate 15 located on a conveyance surface.

It is to be understood that in order to achieve a stereoscopic display effect, the protective shell 10 is made of a transparent material at least at its top end and its side wall.

Figure 9:
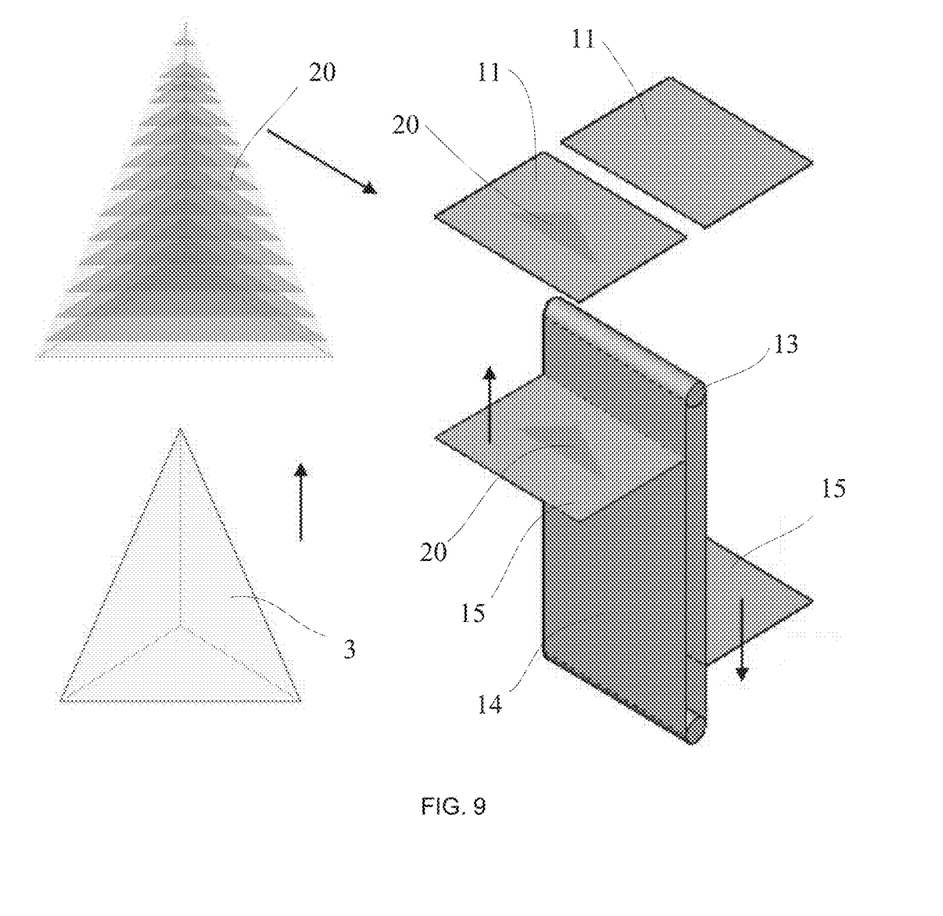
FIG. 9 is a schematic representation of an embodiment of a displacement-type scanning stereoscopic display apparatus provided by the disclosure.
Figure 10:
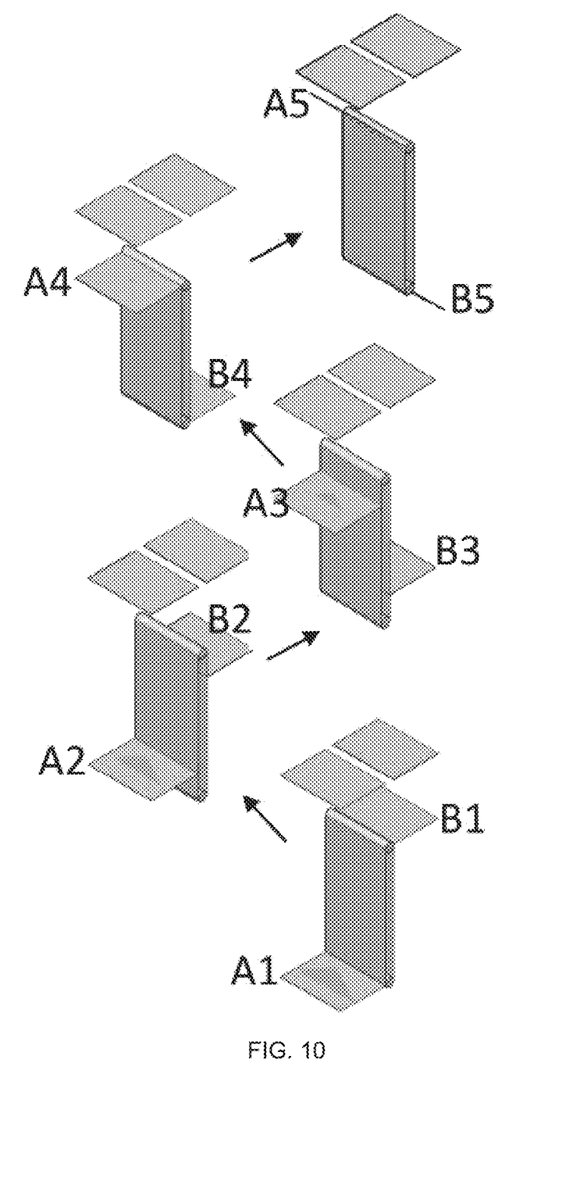
FIG. 10 is a schematic view of the position of a scattering plate in a display cycle in an embodiment of the displacement-type scanning stereoscopic display apparatus provided by the disclosure.
Figure 11:
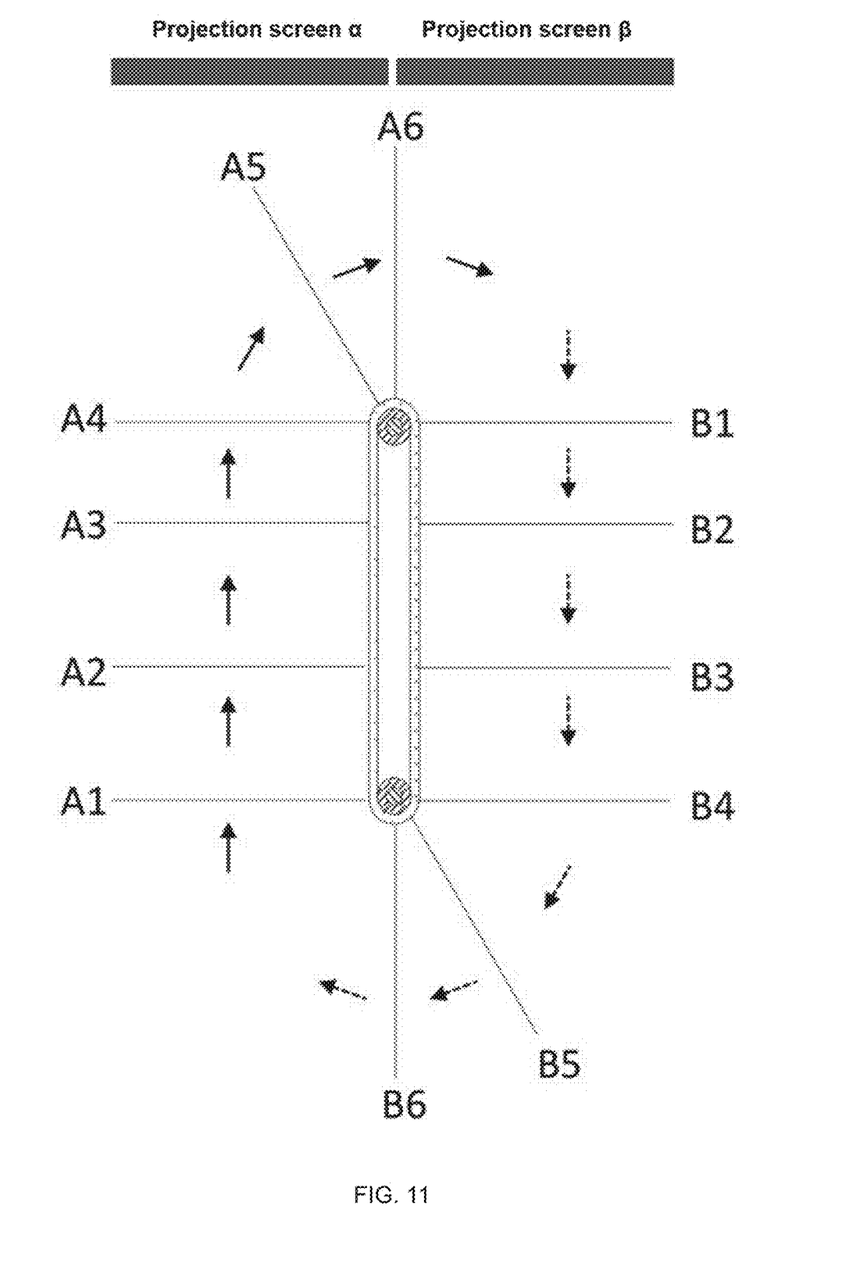
FIG. 11 is a simplified diagram corresponding to FIG. 10.

As shown in FIGS. 9 to 11, the operation principle of a displacement type scanning display apparatus according to the disclosure is shown. Referring to FIG. 9, it can be seen that it is first necessary to generate a plurality of parallel image slices 20 in accordance with the stereoscopic image 3 to be displayed; the rotary shafts 10 drive the belt 14 to rotate at high speed and the scatter plates 15 fixed on the conveyor belt 14 periodically receive the projection of the image slices 20 from the projection screen. The scattering plate 15 moves from position A1 to A4, completes the scanning of an image slice, and utilizes the visual presence of the human eye to present a stereoscopic image.

As can be seen from FIG. 10 to FIG. 11, the position of the scattering plate A reaches A1, A2, A3, A4, A5, and A6 in turn in one scanning display period, and the image slices projected by the projection screen α are received at each position;

simultaneously, the position of the scattering plate B reaches B1, B2, B3, B4, B5, and B6 in turn, and the image slices projected by the projection screen β are received at each position.

It is to be understood that each of the scattering plate has only six positions, only for example, and in practical applications, when more projection positions need to be disposed, the projection screen will project an image slice to the opposite scattering plate on each of the projection positions.

Figure 12:
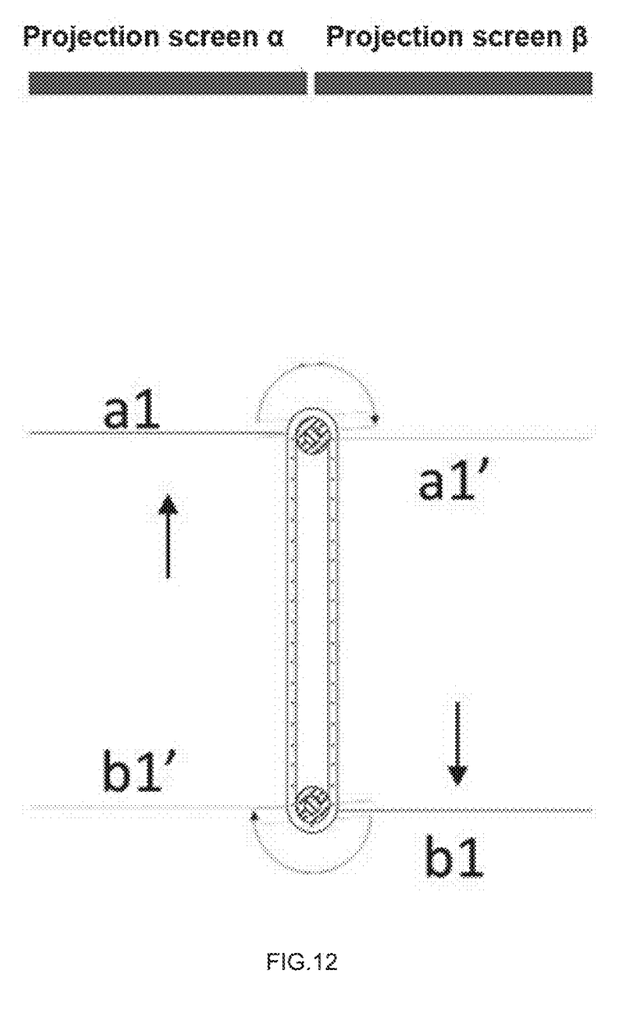
FIG. 12 is a schematic diagram showing the appearance of a displaying blind zone in one embodiment of the displacement-type scanning stereoscopic display apparatus provided by the disclosure.

As shown in FIG. 12, it is a schematic diagram showing the appearance of a blind zone in one embodiment of the displacement type scanning display apparatus provided by the disclosure; it can be understood that when two scattering plates are used, during the process that the scattering plate A moves from position a1 to position a1' and the scattering plate B moves from position b1 to position b1', the image slice is not displayed on the scattering plate, that is, the process is a blind zone. The distance of the blind zone is half the distance of the rotary shaft; but in theory, when the rotation speed of the rotary shaft is constant, the smaller the rotary shaft is, the faster the switching speed of the moving process from position a1 to position a1' (or position b1 to position b1') is, and thus the shorter the blind time is. Since the diameter of the rotary shaft is relatively smaller than the length of the conveyor belt, the display effect can be enhanced by increasing the scanning frequency of the image slice.

Figure 13:
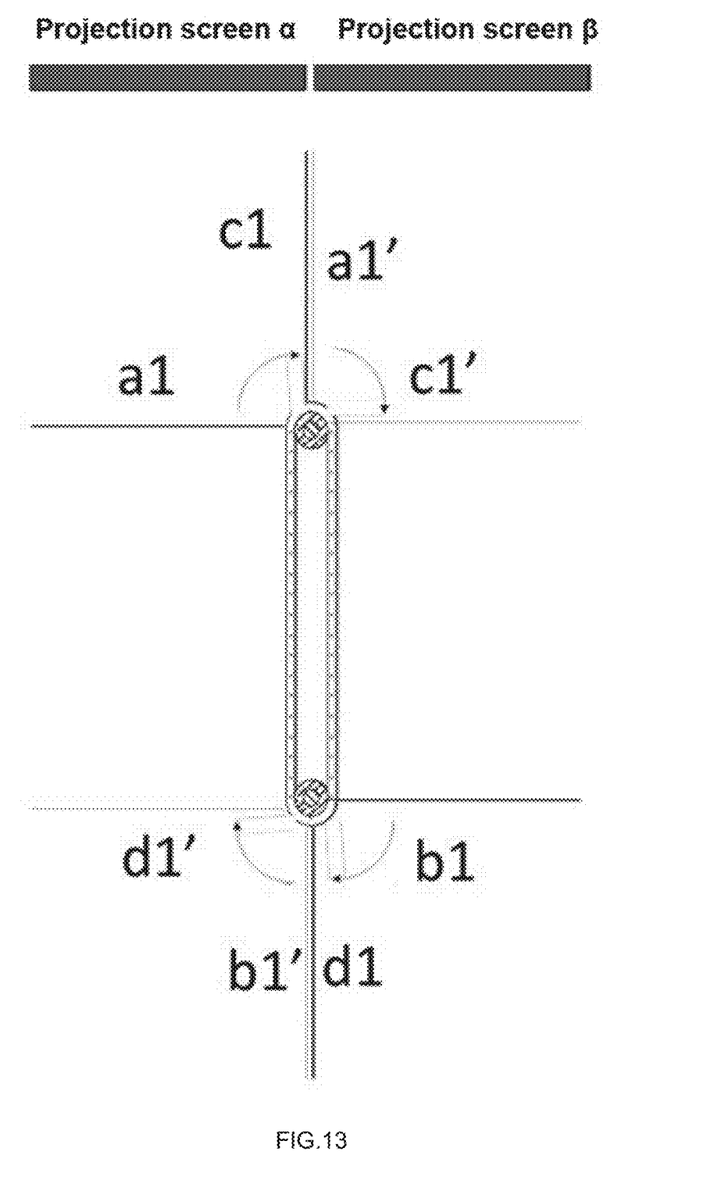
FIG. 13 is a schematic diagram showing a displaying blind zone is overcome in another embodiment of the displacement-type scanning stereoscopic display apparatus provided by the disclosure.

In another embodiment, the time of displaying the blind zone may also be reduced by increasing the number of the scatter plates; as shown in FIG. 13, in another embodiment of the disclosure, the scattering plates 15 are four pieces, and the lengths of the two conveyor belts between a first scattering plate 150 and a third scattering plate 152 are the same; a second scattering plate 151 is disposed in a clockwise direction of the first scattering plate 150, a length of a conveyor belt between the first scattering plate 150 and the second scattering plate 151 is ¼ of a circumferential length of the rotary shaft; and a fourth scattering plate 153 is disposed in a clockwise direction of the third scattering plate 152, a length of a conveyor belt between the third scattering plate 152 and the fourth scattering plate 153 is ¼ of a circumferential length of the rotary shaft.

As can be seen from the schematic diagram shown in FIG. 13, by adding two scattering plates, the time for displaying the blind zone can be reduced.

Figure 14:
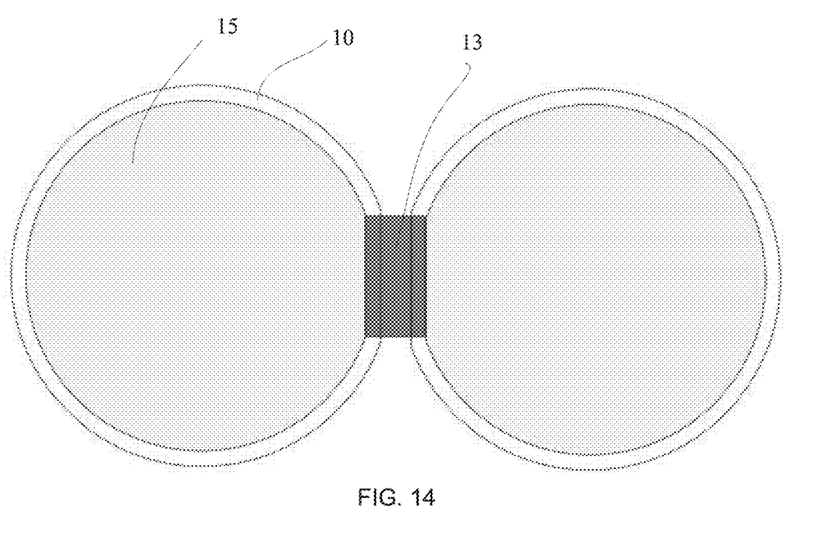
FIG. 14 is a schematic top view of further another embodiment of the displacement-type scanning stereoscopic display apparatus provided by the disclosure.

As shown in FIG. 14, there is shown a schematic top view of still another embodiment of the displacement-type scanning stereoscopic display apparatus according to the disclosure. And the shape of the scattering plate 15 is arc. It can be understood that the shape of the scattering plate in the disclosure is not limited to square and arc, and any stereoscopic display apparatus capable of periodically generating stereoscopic images by flipping method belongs to the scope of the disclosure.

It is to be understood that in the above embodiments, all the examples are the implementation method that the image slices are projected onto the scattering plate through the projection screen. It will be understood by those skilled in the art that the projection screen may be omitted in some applications, and the image display may be performed directly through the scattering plate; for example, by replacing the scattering plate with a display plate, the image slices are transmitted to the display plate during the moving process of the display plate, thereby the display effect of the stereoscopic object is obtained.

In other embodiments of the disclosure, it is also possible to provide a displacement-type scanning stereoscopic display apparatus including:

a protective shell having a sealed stereoscopic box structure;

light shielding cases including a first light shielding case and a second light shielding case, wherein the first light shielding case disposed around an upper side surface of the protective shell, and the second light shielding case is disposed around a lower side surface of the protective shell, and an area between the first and the second light shielding cases being a display area;

two rotary shafts pivoted parallel to each other between two opposite sides of the protective shell, and one of the two shafts is located at top of the display area and the other at bottom of the display area, the two rotary shafts keeping a same direction of rotation;

a conveyor belt surrounding the two rotary shafts to form two parallel conveying surfaces;

at least two display plates, fixed to the outside of the conveyor, applied to display image slices of stereoscopic images at predetermined frequencies; In one embodiment, the display plate may be a translucent display screen;

the rotary shaft is uniformly rotated at a high speed and fixed on the conveyor belt and is vertically spaced from the conveyor belt, and when the display plates are moved from one of the rotary shaft positions to the other rotary shaft position, a scanning display of the image slice corresponding to the stereoscopic image is completed.

The protective shell is filled with a light gas or is a vacuum environment to reduce or avoid the resistance that the display plate is subjected during high speed movement.

The two rotary shafts have the same diameter.

The display plates are two pieces and the lengths of the two conveyor belts located between the two display plates are the same.

The display plates are four pieces and the lengths of the two conveyor belts between a first and a third display plates display plate are the same; a second display plate is disposed in a clockwise direction of the first display plate, a length of a conveyor belt between the first display plate and the second display plate is ¼ of a circumferential length of the rotary shaft; a fourth display plate is disposed in a clockwise direction of the third display plate, a length of a conveyor belt between the third display plate and the fourth display plate is ¼ of a circumferential length of the rotary shaft.

The protective shell is made of a transparent material at least at a display region of its side wall.

For more details, reference may be made to the description of FIGS. 5 to 13, and the details will not be described here.

The embodiment of the disclosure has the following advantageous effects:

First, in the embodiment of the disclosure, the moving screen (such as a scattering plate or a display plate) is uniformly moved in the display area, the motion mechanism is linearly moved, and there is no acceleration/deceleration condition, and the load of the drive mechanism can be reduced.

At the same time, in the embodiment of the disclosure, the movement of the moving screen is driven by the rotation of the rotary shaft, and the rail movement mechanism is not required to reduce or avoid the friction;

Further, in the embodiment of the disclosure, the protective shell of the stereoscopic display apparatus is filled with a light gas or is a vacuum environment to reduce or avoid the resistance that the display plate is subjected during high speed movement, and further improve the stereoscopic display apparatus of the service life;

In addition, in the embodiment of the disclosure, since the at least two scattering plates or the display plate are disposed, the moving screen only needs to pass the display area once in one scanning period, so the display efficiency can be improved; simultaneously, both front and rear stereoscopic display areas can be formed.

It is to be noted that, in the context, relational terms such as first and second are used only to distinguish an entity or an operation from another entity or another operation without necessarily requiring or implying that such entities or operations have any such actual relationship or sequence. Moreover, terms "include", "comprise" or any other variant thereof is intended to encompass a non-exclusive inclusion such that processes, methods, articles, or devices that include a series of elements include not only those elements but also those that are not explicitly listed. In the absence of more restrictions, the elements defined by the statement "including a . . . " do not preclude the presence of additional elements in the process, method, article, or device that includes the elements.

It should be indicated that the present application can also be improved and modified by those skilled in the art without departing from the principle of the present application, and these improvements and modifications also fall within the protection scope of the claims of the present application.

What is claimed is:

1. A displacement-type scanning stereoscopic display apparatus, comprising:
    a protective shell having a sealed three-dimensional box structure;
    projection screens, disposed at a top end of the protective shell, applied to project an image slice of a stereoscopic image at a predetermined frequency;
    light shielding cases comprising a first light shielding case and a second light shielding case, wherein the first light shielding case is disposed around an upper side surface of the protective shell, the second light shielding case is disposed around a lower side surface of the protective shell, and an area between the first and the second light shielding cases is a display area;
    two rotary shafts pivoted parallel to each other between two opposite sides of the protective shell, wherein one of the two shafts is located at top of the display area, the other is located at bottom of the display area, and the two rotary shafts keep a same direction of rotation;
    a conveyor belt surrounding outside of the two rotary shafts to form two parallel conveying surfaces; and
    at least two scattering plates, fixed to outside of the conveyor, applied to scatter the image slices projected by the projection screens;
    wherein the rotary shaft is uniformly rotated at a high speed, the scattering plates fixed on the conveyor belt periodically receives image slices projected from the projection screens, and when the scattering plates are moved from one of the rotary shaft positions to the other rotary shaft position, a scanning display of the image slice corresponding to the stereoscopic image is completed;
    wherein the two rotary shafts have a same diameter; the scattering plates are two pieces, and lengths of the two conveyor belts located between the two scattering plates are the same;
    wherein the scattering plates are four pieces, and lengths of the two conveyor belts between a first scattering plate and a third scattering plate are the same; a second scattering plate is disposed in a clockwise direction of the first scattering plate, a length of the conveyor belt between the first scattering plate and the second scattering plate is ¼ of a circumferential length of the rotary shaft; and a fourth scattering plate is disposed in a clockwise direction of the third scattering plate, a length of the conveyor belt between the third scattering plate and the fourth scattering plate is ¼ of a circumferential length of the rotary shaft.

2. The displacement-type scanning stereoscopic display apparatus according to claim 1, wherein internal of the protective shell is filled with a light gas or is a vacuum environment.

3. The displacement-type scanning stereoscopic display apparatus according to claim 1, wherein the projection screens are two pieces, and each of the projection screens is facing a scattering plate located on a conveying surface.

4. The displacement-type scanning stereoscopic display apparatus according to claim 1, wherein the protective shell is made of a transparent material at least at a display region of top and side wall thereof.

5. A displacement-type scanning stereoscopic display apparatus, comprising:
    a protective shell having a sealed stereoscopic box structure, and internal of the protective shell being filled with a light gas or being a vacuum environment;
    projection screens, disposed at a top end of the protective shell, applied to project an image slice of a stereoscopic image at a predetermined frequency;
    light shielding cases comprising a first light shielding case and a second light shielding case, wherein the first light shielding case is disposed around an upper side surface of the protective shell, the second light shielding case is disposed around a lower side surface of the protective shell, and an area between the first and the second light shielding cases is a display area;
    two rotary shafts pivoted parallel to each other between two opposite sides of the protective shell, wherein one of the two shafts is located at top of the display area, the other is located at bottom of the display area, and the two rotary shafts keep a same direction of rotation;
    a conveyor belt surrounding the two rotary shafts to form two parallel conveying surfaces;
    at least two scattering plates, fixed to outside of the conveyor, applied to scatter the image slices projected by the projection screens;
    wherein the projection screens are two pieces, each of the projection screens faces a scattering plate located on a conveying surface; the rotary shaft is uniformly rotated at a high speed, the scattering plates fixed on the conveyor belt periodically receives image slices projected from the projection screens, and when the scattering plate is moved from one of the rotary shaft positions to the other rotary shaft position, a stereoscopic image is completed Image slices are scanned;

wherein the two rotary shafts have a same diameter; the scattering plates are two pieces, and lengths of the two conveyor belts located between the two scattering plates are the same;

wherein the scattering plates are four pieces, wherein lengths of the two conveyor belts between a first and a third scattering plates scattering plate are the same; a second scattering plate is disposed in a clockwise direction of the first scattering plate, a length of a conveyor belt between the first scattering plate and the second scattering plate is ¼ of a circumferential length of the rotary shaft; and a fourth scattering plate is disposed in a clockwise direction of the third scattering plate, a length of a conveyor belt between the third scattering plate and the fourth scattering plate is ¼ of a circumferential length of the rotary shaft.

6. The displacement-type scanning stereoscopic display apparatus according to claim 5, wherein the protective shell is made of a transparent material at least at a display region of top and side wall thereof.

7. A displacement-type scanning stereoscopic display apparatus, comprising:
   a protective shell having a sealed stereoscopic box structure;
   light shielding cases comprising a first light shielding case and a second light shielding case, wherein the first light shielding case is disposed around an upper side surface of the protective shell, the second light shielding case is disposed around a lower side surface of the protective shell, and an area between the first and the second light shielding cases is a display area;
   two rotary shafts pivoted parallel to each other between two opposite sides of the protective shell, wherein one of the two shafts is located at top of the display area, the other is located at bottom of the display area, and the two rotary shafts keep a same direction of rotation;
   a conveyor belt surrounding on outside of the two rotary shafts to form two parallel conveying surfaces; and
   at least two display plates, fixed to the outside of the conveyor, applied to display image slices of stereoscopic images at predetermined frequencies;
   wherein the rotary shaft is uniformly rotated at a high speed, the display plate fixed on the conveyor belt and vertically spaced from the conveyor belt periodically displays image slices, and when the display plates are moved from one of the rotary shaft positions to the other rotary shaft position, a scanning display of the image slice corresponding to the stereoscopic image is completed;
   wherein internal of the protective shell is filled with a light gas or is a vacuum environment;
   wherein the two rotary shafts have a same diameter; the display plates are two pieces, and lengths of the two conveyor belts located between the two display plates are the same;
   wherein the display plates are four pieces, wherein lengths of the two conveyor belts between a first and a third display plates display plate are the same; a second display plate is disposed in a clockwise direction of the first display plate, a length of a conveyor belt between the first display plate and the second display plate is ¼ of a circumferential length of the rotary shaft; a fourth display plate is disposed in a clockwise direction of the third display plate, a length of a conveyor belt between the third display plate and the fourth display plate is ¼ of a circumferential length of the rotary shaft.

\* \* \* \* \*